Figure 1:
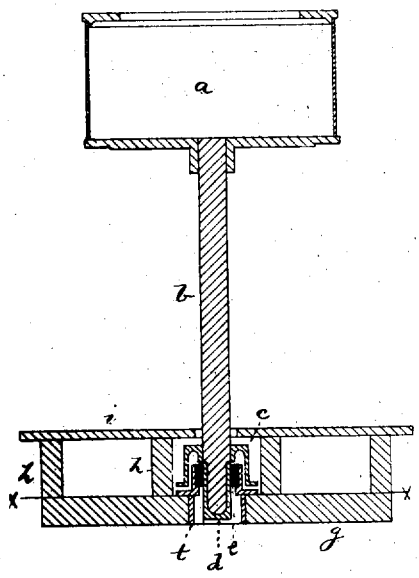

D. M. WESTON.

Self-Balancing Centrifugal Machine.

No. 8,489. Reissued Nov. 12. 1878.

Witnesses

N. E. Whitney.

A. Hunnewadel

Inventor.

David M. Weston by Crosby & Gregory Attys.

UNITED STATES PATENT OFFICE.

DAVID M. WESTON, OF BOSTON, MASSACHUSETTS.

IMPROVEMENT IN SELF-BALANCING CENTRIFUGAL MACHINES.

Specification forming part of Letters Patent No. 82,049, dated September 8, 1868; Reissue No. 8,489, dated November 12, 1878; application filed November 1, 1878.

DIVISION B.

*To all whom it may concern:*

Be it known that I, DAVID M. WESTON, of Boston, in the State of Massachusetts, have invented a new and useful Improvement in Self-Balancing Centrifugal Machines; and I do hereby declare that the following is a full, clear, and exact description of the same, reference being had to the accompanying drawings, making part of this specification, and to the letters of reference marked thereon.

The object of this invention is to avoid the injurious effects caused by the unbalanced loading of an upright shaft rotating at high velocity, as illustrated by the irregular or unequal distribution of material to be acted upon within the revolving cylinder of a centrifugal machine, as well as by the unequal distribution of weight of material composing the structure itself; but this object I accomplish by the use of a different method from that described in the schedule annexed to the reissue of my former patent, dated January 14, 1868, No. 2,845; and the invention consists, chiefly, in a vertical rotating shaft supported at its lower end only, combined with a box fitted to embrace the lower end of the shaft, and a flexible or yielding spring surrounding the box, and operating as hereinafter described, instead of suspending it from a flexible bearing or connection at its top, as heretofore done by me, thus reversing the former method.

When an upright shaft in fixed bearings is unequally loaded and rotated at high velocity it tends to revolve eccentrically, and vibrates and jars within its bearings, thereby causing great waste of power, and limiting the speed at which the shaft and its load may be revolved.

To meet this condition of things it is necessary that the bearing should have sufficient freedom of motion to allow the shaft and its load to find and revolve around the center of gravity of the rotating mass; that in order to permit such rapid rotation the spindle should have as little weight as is consistent with proper strength; that while the shaft is free to vibrate when in a vertical position, it shall meet with a rapidly-increasing resistance when it leaves that position, so as to prevent the shaft from being thrown into gyrations, and so as to compel it to revolve as nearly as may be about its center of gravity; and that the bearing shall be connected with its fixed support by means of some flexible or elastic medium, which, by virtue of its elasticity, will permit the necessary movement of the bearing without making and breaking its contact with its support or with the shaft; otherwise the rapid succession of such contacts and impacts of their surfaces would produce a very objectionable noise and jar, and would soon derange the machine, thereby consuming power, causing wear, and limiting speed.

Figure 2:
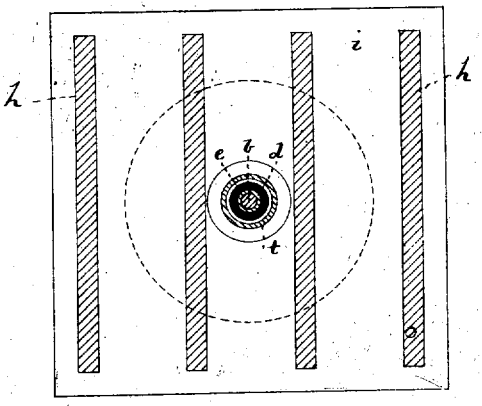

Figure 1 is a longitudinal sectional view of my invention as applied to a centrifugal machine, with the rest upon which the shaft and box is supported. Fig. 2 is a section of Fig. 1 on the line *x x*.

Referring, for the sake of comparison, to my patented machine, hereinbefore referred to, it will be seen that the cylinder or basket is attached to a hollow shaft, which surrounds a shaft or spindle held by an india-rubber bushing or spring contained within a socket attached firmly to the frame. In reversing this contrivance I have departed from the construction shown in the former patent, in that I have substituted an upright bearing instead of the suspended non-rotating shaft or spindle, and have inserted therein the lower end of a rotating shaft or spindle, which carries the revolving load at its upper end, which is unrestrained by a bearing.

It will be seen, on referring to Fig. 1, that the revolving cylinder or receptacle *a*, which contains the material to be operated upon, is directly connected with a rotating perpendicular shaft or spindle, *b*, upon which is placed the pulley *c*, to which the driving-belt is applied. This shaft *b* revolves in the box *d*, suitably held and supported by the flexible easily-yielding spring *e*, made of rubber or other elastic material, placed around the outer circumference of the box *d* within a stationary socket or fixed support, *f*, which is herein shown as securely held upon the cross-timbers *g* below, and attached firmly to the lower surface of the floor-timbers *h*, on which the floor *i* rests.

Power being applied by means of a driving-belt attached to the pulley *c* below the platform or floor, the machine commences to revolve without any support or control to keep it in position other than the spring *e*, which is made so flexible as to have just sufficient strength to preserve the vertical position of the machine while stationary, but not so rigid as to exercise control over its revolutions in motion. The natural tendency of the machine under these conditions is to find an axis of revolution in perfect equilibrium.

The pull of the belt should be applied as nearly opposite the box as possible, to thereby reduce the tendency of the belt to strain or deflect the shaft from perpendicular position, and therefore the pulley *c* is extended down over the box *d* and the bushing.

It is obvious that a shaft supported only at its lower end, in the manner herein described, is practically free, within certain limits, to move bodily in any lateral direction, as well as to incline from a perpendicular, thus being enabled to revolve steadily about the center of gravity determined by the unequal distribution of the load upon the shaft.

By supporting the shaft or spindle at its lower end only, its upper end is left entirely free to oscillate or vibrate under the action of an unequal distribution of its load, the length of the shaft is made shorter, thereby reducing weight, the friction of a bearing at the upper end of the shaft is obviated, and cost of mechanism is reduced. The power to rotate the shaft being applied substantially at or near the bearing at the lower end of the shaft also permits the upper end of the shaft to be left entirely free and unrestrained.

I claim—

1. A rotating vertical shaft or spindle supported by its lower end only, and a box fitted to embrace its lower end, combined with a flexible or yielding spring surrounding the outside of the box, substantially as and for the purpose described.

2. A rotating vertical shaft or spindle supported by its lower end only, a box fitted to embrace its lower end, and a flexible or yielding spring placed outside the box, combined with a fixed support external to the spring, substantially as and for the purpose described.

3. A rotating vertical shaft or spindle supported by its lower end only, a box fitted to embrace its lower end, a yielding spring supported outside the box, combined with a sleeved pulley attached to the said shaft and extended downward about the yielding spring and box at the lower end of the rotating spindle, operating substantially as and for the purpose described.

DAVID M. WESTON.

Witnesses:
G. W. GREGORY,
N. E. WHITNEY.